(12) United States Patent
Trinkel et al.

(10) Patent No.: US 7,164,754 B2
(45) Date of Patent: Jan. 16, 2007

(54) CONTROL OF ACCESS FOR TELEPHONE SERVICE PROVIDERS USING VOICE RECOGNITION

(75) Inventors: Marian Trinkel, Kreuzau OT Untermaubach (DE); Franz Steimer, Berlin (DE); Christel Mueller, Schulzendorf (DE)

(73) Assignee: Deutsche Telekom AG, Bonn (DE)

( * ) Notice: Subject to any disclaimer, the term of this patent is extended or adjusted under 35 U.S.C. 154(b) by 195 days.

(21) Appl. No.: 10/311,676

(22) PCT Filed: Jun. 15, 2001

(86) PCT No.: PCT/EP01/06778

§ 371 (c)(1),
(2), (4) Date: Jun. 5, 2003

(87) PCT Pub. No.: WO02/03668

PCT Pub. Date: Jan. 10, 2002

(65) Prior Publication Data

US 2004/0015355 A1  Jan. 22, 2004

(30) Foreign Application Priority Data

Jul. 5, 2000 (DE) .................. 100 32 756

(51) Int. Cl.
*H04M 1/64* (2006.01)
(52) U.S. Cl. .............................. 379/88.02; 379/88.21; 379/188; 340/5.52; 704/270; 705/1
(58) Field of Classification Search ............ 379/88.01, 379/88.02, 188; 704/250; 705/64; 713/186
See application file for complete search history.

(56) References Cited

U.S. PATENT DOCUMENTS

| | | | | |
|---|---|---|---|---|
| 5,502,759 | A | * 3/1996 | Cheng et al. | ............ 379/88.02 |
| 5,655,013 | A | * 8/1997 | Gainsboro | .................. 379/188 |
| 6,012,027 | A | 1/2000 | Bossemeyer et al. | ....... 704/243 |
| 6,614,885 | B1 | * 9/2003 | Polcyn | .................... 379/88.02 |

FOREIGN PATENT DOCUMENTS

| | | |
|---|---|---|
| EP | 1022888 | 7/2000 |
| WO | 9608907 | 3/1996 |

* cited by examiner

*Primary Examiner*—Gerald Gauthier
(74) *Attorney, Agent, or Firm*—Darby & Darby

(57) ABSTRACT

A telecommunications network includes a plurality of subscriber stations, a plurality of network elements and a voice recognition module. The voice recognition module is associated with a network element and is configured to recognize at least one biometric voice parameter.

18 Claims, 3 Drawing Sheets

CONTROL OF ACCESS FOR TELEPHONE SERVICE PROVIDERS USING VOICE RECOGNITION

The present invention relates generally to a telecommunications network including a plurality of network elements and a plurality of subscriber stations, and in particular to a telecommunications network including a voice recognition module associated with one of the network elements for recognizing biometric voice parameters.

Telecommunications networks of the type discussed here are generally known. They feature a plurality of network elements which can be constituted, for example, by switching centers and/or a network monitoring or control element. A plurality of subscriber stations, or connections, which are also referred to as "terminal stations" and ultimately enable the user to access the network, originate at the network elements, in particular at the switching centers.

In telecommunications networks of that kind, suppliers who are also referred to as "providers" offer services which, in addition to the actual connection fee, result in costs for the service offered or used. In many cases, problems arise because unauthorized persons, in particular persons incapable of contracting, order goods or services from a provider, but no contract results from this because this order was given by persons who are incapable of contracting as mentioned above. Moreover, the known networks have the disadvantage that, in many cases, services are used but when the network operator issues the bill, the user denies having used the service. This often leads to problems especially with the so-called "0190 telephone numbers".

SUMMARY OF THE INVENTION

Therefore, it is an object of the present invention to provide a telecommunications network which essentially avoids the above mentioned problems.

The present invention provides a telecommunications network including a plurality of subscriber stations, a plurality of network elements, and at least one voice recognition module. Each voice recognition module is associated with a respective network element and configured to recognize at least one biometric voice parameter.

According to the present invention, the network has the feature that at least one of the network elements has a voice recognition module for recognizing biometric voice parameters. If a service which is accessible via the telecommunications network and for which service charges arise in addition to the connection costs is called, the voice recognition module is automatically turned on, especially when the subscriber is prompted, for example, by a recorded message to specify his/her desired service so that biometric voice parameters of the user of the subscriber station can then be obtained. It is, of course, also possible to provide a query facility internally within the network so that when certain prefix numbers are dialed, a recorded message is provided by the network operator to prompt the user, for example, to answer a question so that the biometric voice parameters can then be obtained. If then, after the bill has been issued, problems arise and the user denies having used the service, then the obtained biometric voice parameters can be evaluated and, by subsequently analyzing the voice of the user, clear statements can be made as to whether this subscriber has actually used the service. Moreover, the voice recognition module according to the present invention allows persons who do not have access rights to be filtered out in advance so that these do not get access to such services at all. Using modern voice recognition modules, the sex of the caller, the age, etc., can also be determined without difficulty. For example, if a caller is determined to be under 18 years of age, the caller can be denied access to such services. Ultimately, the telecommunications network according to the present invention offers the advantage that problematic cases can be avoided in advance and that misuse of services can be reduced or possibly even completely avoided.

Moreover, the recorded biometric voice parameters can be analyzed for statistical purposes. For example, a specific age group that contacts one and the same service provider can be inferred in this manner. However, this also makes it possible to initiate marketing actions since, ultimately, habits of a subscriber station user can be identified as well. Finally, it is also possible to provide specific service features for specific customer groups so that only this customer group has access to the these service features.

In an embodiment of the present invention, provision is made for a decision device to be associated with the telecommunications network, the decision device thus being connected to at least one network element. The decision device can decide on the basis the obtained biometric voice parameters whether to establish a telecommunications connection from one subscriber station to another subscriber station at all. For example, if a subscriber dials a prefix for a service provider who defines age of majority of the caller as an access condition, the voice recognition module can determine the biometric voice parameters so that then the decision device decides whether to connect the subscriber to the desired subscriber station. In this context, another embodiment of the present invention provides for the telecommunications connection to be interrupted and for the caller to hear an automatic message by which he/she is rejected. Alternatively or additionally, provision can be made for the caller to be put through to an operator at a call center, requiring him/her to verbally specify the desired connection. Finally, the access condition can be checked by questions of the operator so that an operator-assisted call can be made.

In one exemplary embodiment, the voice recognition module is associated with a network monitoring or control element. This network monitoring or control element is also referred to as "service creation point" via which, in particular, the above mentioned service lines can be requested. In another embodiment, the voice recognition module can also be connected to a switching unit, it being possible for this switching unit to be a so-called "local switching center".

In a preferred embodiment, the telecommunications network has an interface to a further telecommunications network. Thus, subscribers of one network can also request services that are offered in or over the further telecommunications network. Here too, it is possible to verify the access rights to a service provider because the voice recognition module is provided.

It is, of course, also possible for the further telecommunications network to have a voice recognition module at at least one network element. In the telecommunications connection from one subscriber station to another subscriber station there exists an access capability to allow the voice recognition module to determine the biometric voice parameters.

In an embodiment of the present invention, provision is made for the voice recognition module to have a voice parameter memory in which are stored the already determined user-specific voice parameters. When this user or subscriber wishes to telecommunicate a second time, then the already stored voice parameters can be used for matching so that it can be determined that this subscriber has contacted the desired call number or the desired service provider before. Then, the telecommunications connection can be established more easily and quickly.

In an embodiment of the present invention, provision is made for the user-specific voice parameters to be provided with a key which is stored as well. This key can be assigned, for example, according to the specific service providers so that it can easily be determined whether one and the same subscriber has contacted this service line more often before. If, for example, when the bill for the telecommunications connections is settled, no notes exist then it is possible to connect directly through to the desired service provider straight away.

BRIEF DESCRIPTION OF THE DRAWINGS

In the following, the present invention will be explained in greater detail based on exemplary embodiments with reference to the drawings, in which.

DETAILED DESCRIPTION

Figure 1:
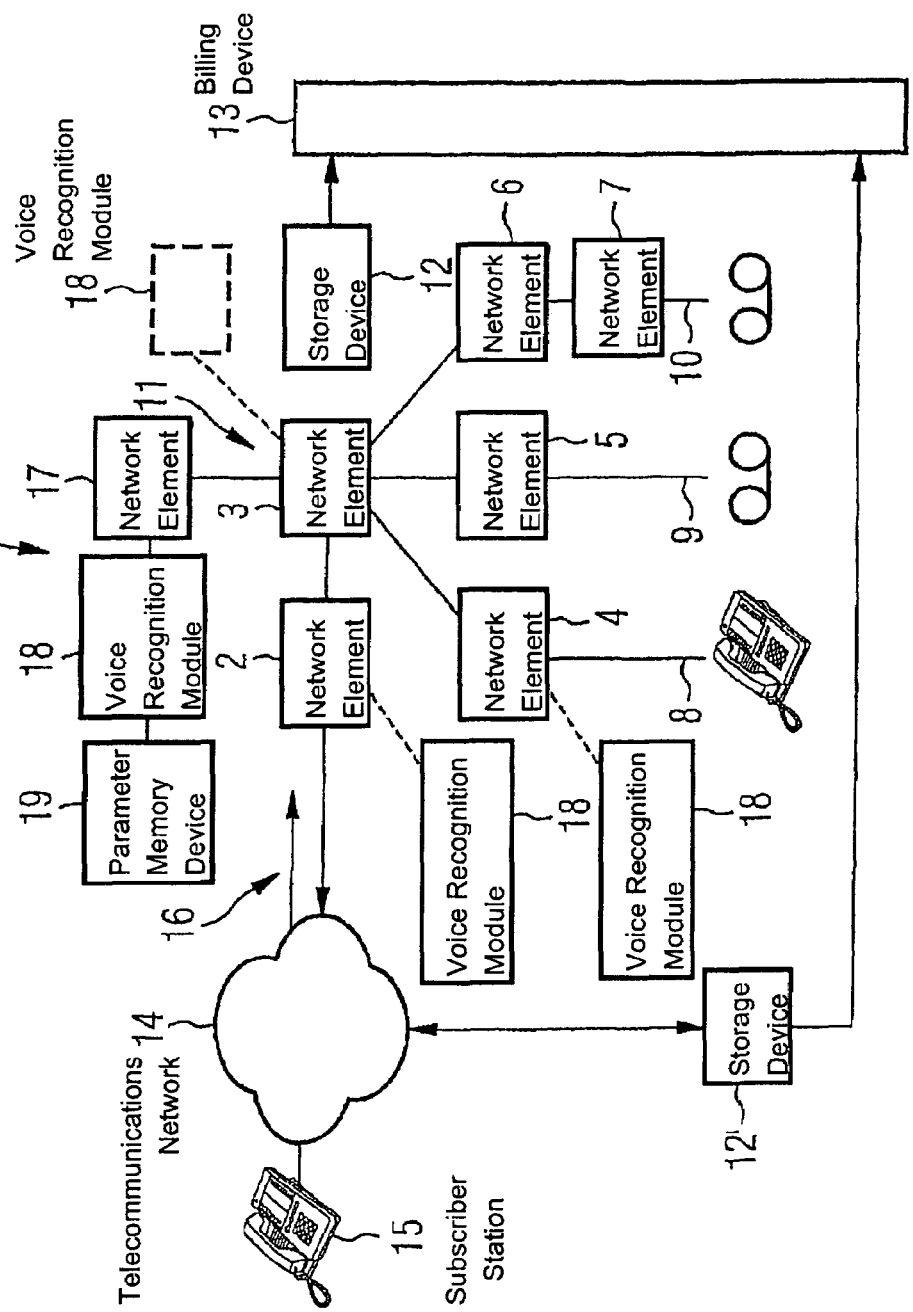
FIG. 1 shows a first exemplary embodiment of a telecommunications network including a voice recognition module.

FIG. 1 shows a first telecommunications network 1 including a plurality of network elements 2 through 7. Moreover, a plurality of subscriber stations 8 through 10 are associated with telecommunications network 1. Subscriber station 8 is connected to telecommunications network 1 via network element 4 which is designed, in particular, as a local switching center that is connected to network element 3. Thus, network element 3 constitutes a network node 11 at which can originate a plurality of switching centers which are constituted by the two network elements 5 and 6.

Between subscriber station 10 and network element 6, provision can be made for a specific switching center which is intended for a particular subscriber or a particular subscriber group and which is constituted by network element 7 here.

Moreover, first telecommunications network 1 features a device 12 in which are stored data for a telecommunications connection between one subscriber station and another subscriber station so that subscriber bills or subscriber station bills can be created via a billing device 13. Billing device 13 can also receive data for billing from a device 12' which is identical in design to device 12 and associated with a second telecommunications network 14. This second telecommunications network 14 also has a plurality of subscriber stations of which, however, only one subscriber station 15 is shown. Between second telecommunications network 14 and first telecommunications network 1, provision is made for an interface 16 which is constituted, in particular, by network element 2. Thus, it becomes clear that it is also possible to establish a telecommunications connection from subscriber station 15 to one of the other subscriber stations 8 through 10 and vice versa.

First telecommunications network 1 has a further network element 17 which is connected to connecting node 11, i.e., to network element 3. Network element 17 is designed, in particular, as a network monitoring or control element which is also referred to as "service creation point" and in which telecommunications connections to service providers, which, in the exemplary embodiment according to FIG. 1 are constituted by subscriber stations 9 and 10, can be monitored. Furthermore, telecommunications network 1 has a voice recognition module 18 which is used to determine biometric voice parameters, in particular, when a telecommunications connection is to be established from one of subscriber stations 8 or 15 to subscriber station 9 or 10 in order to use a service.

If the subscriber at station 8 dials a specific subscriber number or subscriber group prefix, voice recognition module 18 can be switched into the connection and record the voice of the user at station 8 and derive or calculate biometric voice parameters therefrom.

As can be seen in FIG. 1, the voice recognition module can be connected to any of network elements 2 to 7, as shown in FIG. 1 by voice recognition modules depicted in broken lines. However, it becomes clear that at least one voice recognition module 18 is provided. However, it is also possible to provide several of these voice recognition modules at different network elements, if necessary. As can also be inferred from FIG. 1, the voice recognition module has a voice parameter memory device 19 in which can be stored already determined user-specific voice parameters which can be associated with a station 8 and/or a person. Preferably, the biometric voice parameters are stored in voice parameter memory device 19 together with a key which will allow the voice parameters to be associated with a subscriber in a particular simple manner.

Figure 2:
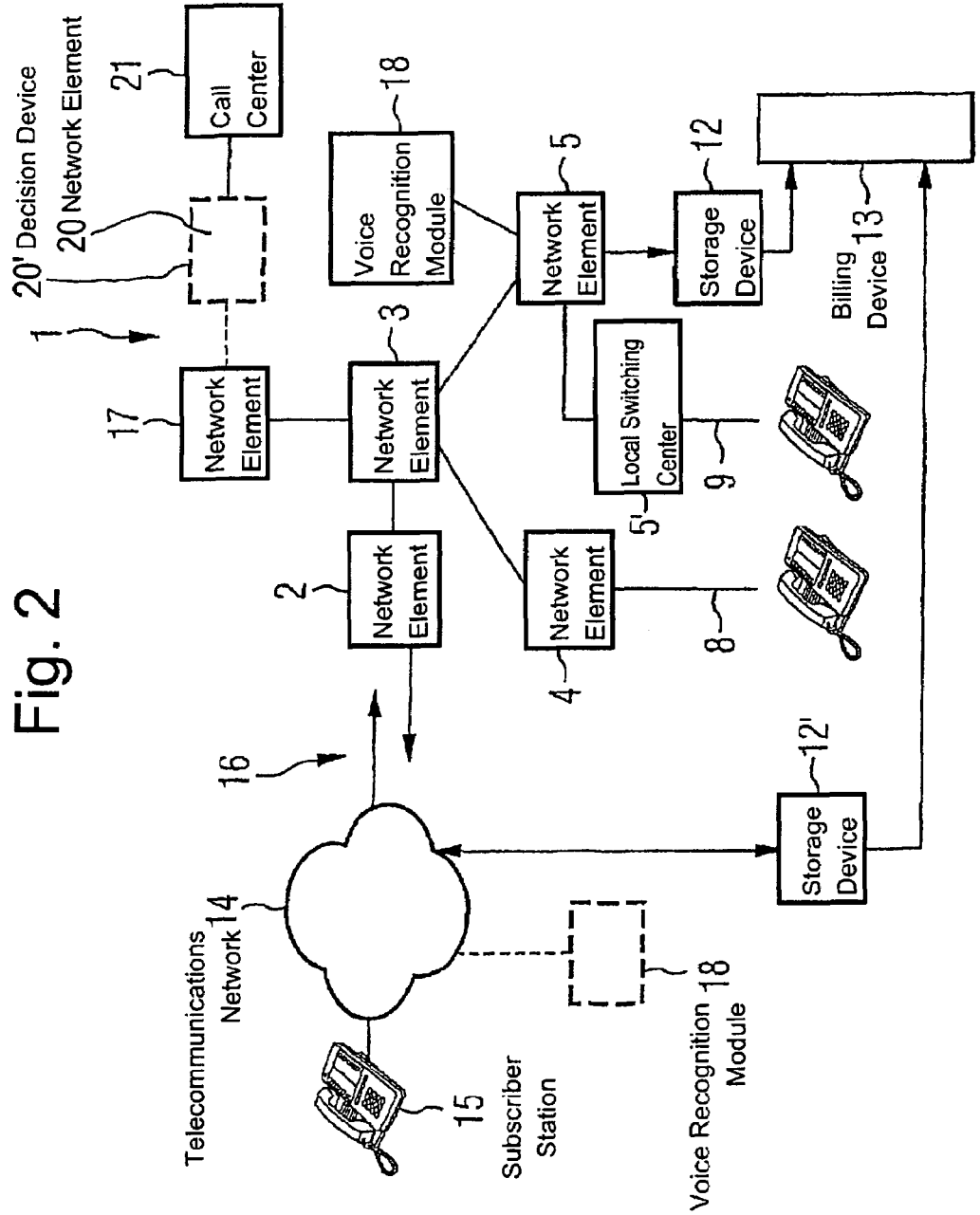
FIG. 2 depicts a second exemplary embodiment of a telecommunications network including a voice recognition module.

FIG. 2 depicts another exemplary embodiment of a telecommunications network 1. Equal or equally acting parts as in FIG. 1 are denoted here by the same reference numerals so that, therefore, reference is made to the description thereof. Here too, network element 5 is designed as a switching center, which, however, is allocated to a subscriber group, in particular to a service provider group, so that it is possible to connect from network element 5 to the downstream local switching centers, of which only one local switching center 5', to which is connected subscriber station 9, is shown here. Voice recognition module 18 is connected to this network element 5.

It can also be seen from FIG. 2 that second telecommunications network 14 can also feature a voice recognition module 18. Thus, it is possible to establish a voice-monitored connection from a subscriber station 8 via network elements 4, 3 and 2 to a subscriber station 15 of the second network.

Since there is also a voice recognition module 18 arranged within first network 1, it is also possible to monitor connections within this network 1 by means of voice recognition. If one of voice recognition modules 18 identifies a subscriber who should not get access rights to subscriber station 9, the subscriber at station 8 can be put through to a call center 21 via an optionally provided further network element 20 so that, after checking the access rights of the subscriber at station 8, an operator-assisted call can be made to subscriber station 9 or to another subscriber station. Thus, network element 20 constitutes a decision device 20' which decides on the basis of the voice parameters whether to connect a subscriber to the desired subscriber station, whether to reject the subscriber and/or whether the subscriber should be connected to the call center.

Figure 3:
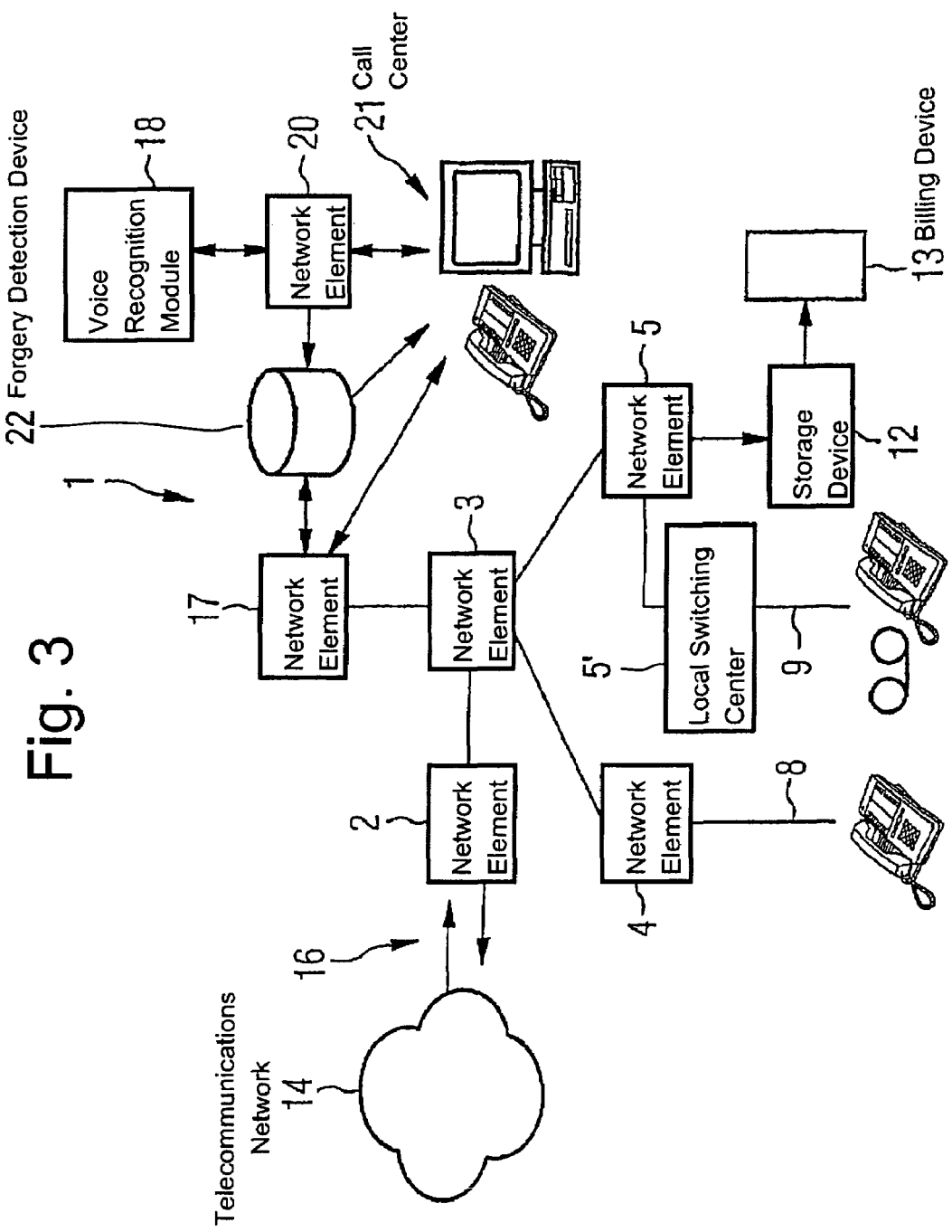
FIG. 3 shows a third exemplary embodiment of a telecommunications network including a voice recognition module.

FIG. 3 depicts a third exemplary embodiment of a telecommunications network 1. Equal or equally acting parts as in FIGS. 1 and 2 are provided with the same reference numerals. Therefore, reference is made to the corresponding sections of the specification. Between network element 17 and network element 20, provision is made for a so-called "forgery detection device" 22 which is designed to detect whether a subscriber disguises his/her voice or, for example, whether he/she plays a tape of a different voice. If forgery detection device 22 detects such a manipulation, it can put the calling subscriber directly through to an operator of call center 21. If forgery detection device 22 does not detect any manipulation attempt, then the connection desired by a subscriber can be established during which, again, biometric voice data or parameters are determined by voice recognition module 18 via network element 20. If access rights are identified here, it is possible to connect through to the desired subscriber or service provider. If no access rights are identified, it is again possible to connect through to the operator of call center 21.

If specific subscriber numbers or specific subscriber groups (having a special prefix) are dialed, provision is made in telecommunications networks 1, in particular, to carry out a preliminary conversation with the calling subscriber. To this end, a message pointing out the specific prefix number or the specific subscriber station can be played from a tape. In order to induce the user to reply, provision can be made, in particular, to establish the desired connection only when the subscriber tells the desired call number or the desired station number by voice. Thus, it can be provided that access to specific subscriber groups is enable only by dialing the prefix whereupon the desired subscriber number must be given by the calling subscriber by voice. In this manner, it is reliably guaranteed that the biometric voice data can actually be obtained. If voice recognition module 18 decides that the telecommunications subscriber has the access rights, for example, the required minimum age, the telecommunications connection can be established.

Thus, it is shown that, using the voice recognition module according to the present invention, problematic cases, which can include, for example, underage subscribers, can be filtered out in advance. Moreover, it is possible to prove that a subscriber has actually used a service provider because the subscriber can be unequivocally identified by the biometric voice parameters. However, this also results in a reduction and possibly even in the elimination of the misuse of such service providers. Moreover, the network operator is provided with the possibility of creating statistics of customer groups and social groups. The monitoring capability also goes down to the level of individual conversations, which will allow monitoring of selected subscriber numbers. The network operator is also offered possibilities for marketing actions, taking into account the determined biometric voice parameters. Thus, it is possible to determine frequently selected service providers for specific groups of people. Furthermore, it is possible to request special service features for specific customer groups so that special services can be offered, for example, to children and young people. Of course, this can also be intended for other customer groups, even in limited regions.

What is claimed is:

1. A telecommunications network comprising:
    a plurality of subscriber stations;
    a plurality of a network elements;
    at least one voice recognition module, each of the at least one voice recognition module being associated with a respective network element of the plurality of network elements and configured to recognize at least one biometric voice parameter; and
    a decision device associated with at least one of the network elements, the decision device configured to decide, on the basis of the at least one biometric voice parameter, whether to establish a telecommunications connection from one of the subscriber stations to another of the subscriber stations;
    wherein at least a first of the network elements is configured to automatically connect the one subscriber station to a network operator when the decision device decides not to establish the telecommunications connection.

2. The telecommunications network as recited in claim 1 wherein the decision device is integrated into at least one of the at least one voice recognition module.

3. The telecommunications network as recited in claim 1 wherein at least one of the network elements is a network monitoring element, at least one of the at least one voice recognition module being associated with the network monitoring element.

4. The telecommunications network as recited in claim 1 wherein at least one of the network elements is a network control element, at least one of the at least one voice recognition module being associated with the network control element.

5. The telecommunications network as recited in claim 1 wherein at least one of the network elements is a switching unit, at least one of the at least one voice recognition module being associated with the switching unit.

6. The telecommunications network as recited in claim 1 further comprising an interface to another telecommunications network.

7. The telecommunications network as recited in claim 1 further comprising an interface to another telecommunications network, the other telecommunications network including at least one second network element, a respective second voice recognition module being associated with at least one of the at least one second network element.

8. The telecommunications network as recited in claim 1 wherein the at least one voice recognition module includes a voice parameter memory configured to store a previously-recorded user-specific voice parameter.

9. The telecommunications network as recited in claim 8 wherein the user-specific voice parameter is associated with a key and wherein the voice parameter memory is configured to store the key.

10. A telecommunications network comprising:
    a plurality of subscriber stations;
    a plurality of a network elements;
    at least one voice recognition module, each of the at least one voice recognition module being associated with a respective network element of the plurality of network elements and configured to recognize at least one biometric voice parameter; and
    a decision device associated with at least one of the network elements, the decision device configured to decide, on the basis of the at least one biometric voice parameter, whether to establish a telecommunications connection from one of the subscriber stations to another of the subscriber stations;
    wherein the at least one voice recognition module includes a voice parameter memory configured to store a previously-recorded user-specific voice parameter;
    wherein the user-specific voice parameter is associated with a key and wherein the voice parameter memory is configured to store the key; and
    wherein the telecommunications network is configured to automatically connect the one subscriber station to a network operator when the decision device decides not to establish the telecommunications connection.

11. The telecommunications network as recited in claim 10 wherein the decision device is integrated into at least one of the at least one voice recognition module.

12. The telecommunications network as recited in claim 10 wherein at least one of the network elements is a network control element, at least one of the at least one voice recognition module being associated with the network control element.

13. The telecommunications network as recited in claim 10 further comprising an interface to another telecommunications network.

14. A telecommunications network comprising:
a plurality of subscriber stations;
a plurality of a network elements;
at least one voice recognition module, each of the at least one voice recognition module being associated with a respective network element of the plurality of network elements and configured to recognize at least one biometric voice parameter;
a decision device associated with at least one of the network elements, the decision device configured to decide, on the basis of the at least one biometric voice parameter, whether to establish a telecommunications connection from one of the subscriber stations to another of the subscriber stations; and
a forgery detection device configured to detect a manipulation of a voice of a subscriber;
wherein at least one of the network elements is configured to connect the one subscriber station to a network operator when the forgery detection device detects the manipulation.

15. The telecommunications network as recited in claim 14 wherein the manipulation of a voice of a subscriber includes at least one of a disguising of the voice and a playing of a recording of a different voice.

16. The telecommunications network as recited in claim 14 wherein at least one of the network elements is a network monitoring element, at least one of the at least one voice recognition module being associated with the network monitoring element.

17. The telecommunications network as recited in claim 14 wherein at least one of the network elements is a network control element, at least one of the at least one voice recognition module being associated with the network control element.

18. The telecommunications network as recited in claim 14 further comprising an interface to another telecommunications network.

* * * * *